United States Patent
Masuko

(10) Patent No.: US 10,511,242 B2
(45) Date of Patent: Dec. 17, 2019

(54) METHOD FOR AUTONOMOUS OPERATION OF ELECTRICITY-GENERATING DEVICE

(71) Applicant: MEIDENSHA CORPORATION, Tokyo (JP)

(72) Inventor: Toshitake Masuko, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/328,667

(22) PCT Filed: Jul. 27, 2015

(86) PCT No.: PCT/JP2015/071179
§ 371 (c)(1),
(2) Date: Jan. 24, 2017

(87) PCT Pub. No.: WO2016/017559
PCT Pub. Date: Feb. 4, 2016

(65) Prior Publication Data
US 2017/0214348 A1 Jul. 27, 2017

(30) Foreign Application Priority Data
Jul. 28, 2014 (JP) ................................ 2014-152468

(51) Int. Cl.
*H02P 9/04* (2006.01)
*F03B 15/04* (2006.01)
(Continued)

(52) U.S. Cl.
CPC ............... *H02P 9/04* (2013.01); *F03B 13/08* (2013.01); *F03B 15/005* (2013.01); *F03B 15/04* (2013.01);
(Continued)

(58) Field of Classification Search
CPC . H02P 9/04; F03B 13/08; F03B 15/06; H02K 7/1823
See application file for complete search history.

(56) References Cited

U.S. PATENT DOCUMENTS 1,983,917 A * 12/1934 Mitzlaff .................... H02P 9/04
318/105
4,472,103 A * 9/1984 Yamagata .................. F03B 3/18
415/1
(Continued)

FOREIGN PATENT DOCUMENTS

| CN | 101291068 A | 10/2008 |
| CN | 103306886 A | 9/2013 |

(Continued)

OTHER PUBLICATIONS

Chinese Office Action, dated Sep. 25, 2017, 6 pages.
European Search Report, dated Jun. 11, 2018, 7 pages.

*Primary Examiner* — Sean Gugger
(74) *Attorney, Agent, or Firm* — Foley & Lardner LLP

(57) ABSTRACT

When it is not possible for a power generation device to operate coupled to an electric power system, an autonomous operation of connection and disconnection of a load of the power generation device is performed along an efficiency-characteristics curve within a speed range from a rated speed to a maximum speed in the efficiency-characteristics curve of an energy source. During the autonomous operation, an aperture command is outputted to an inlet valve of a water turbine and a first converter is operated in a converter mode when an operation preparation command is outputted by a control unit, a second converter is operated in an inverter mode when a voltage is established by of a DC linkage unit, and the load is connected when the operation preparation is completed.

2 Claims, 8 Drawing Sheets

CONFIGURATION DIAGRAM OF POWER GENERATION DEVICE

(51) Int. Cl.
*F03B 13/08* (2006.01)
*F03B 15/06* (2006.01)
*H02K 7/18* (2006.01)
*F03B 15/00* (2006.01)
*H02J 3/38* (2006.01)

(52) U.S. Cl.
CPC ........... *F03B 15/06* (2013.01); *H02K 7/1823* (2013.01); *F05B 2220/7068* (2013.01); *H02J 2003/388* (2013.01); *Y02E 10/226* (2013.01)

(56) References Cited

U.S. PATENT DOCUMENTS

| | | | | |
|---|---|---|---|---|
| 4,472,104 A | * | 9/1984 | Kuwabara | F03B 15/06 415/1 |
| 4,475,334 A | * | 10/1984 | Kuwabara | F03B 15/06 290/43 |
| 4,578,017 A | * | 3/1986 | Nakamura | F03B 15/06 415/1 |
| 6,175,217 B1 | * | 1/2001 | Da Ponte | H02J 9/066 322/19 |
| 6,611,437 B2 | * | 8/2003 | Kawazoe | H02J 3/1885 363/37 |
| 8,116,914 B2 | | 2/2012 | Ooharra et al. | |
| 2012/0326443 A1 | * | 12/2012 | Vince | F01D 15/10 290/7 |
| 2013/0214533 A1 | | 8/2013 | Hupe et al. | |

FOREIGN PATENT DOCUMENTS

| | | |
|---|---|---|
| EP | 2 557 679 A2 | 2/2013 |
| JP | 64-53072 A | 3/1989 |
| JP | 4003414 B2 | 11/2007 |
| JP | 2008-75521 A | 4/2008 |
| JP | 2008-278725 A | 11/2008 |
| JP | 2012-100478 A | 5/2012 |
| JP | 2014-90549 A | 5/2014 |
| JP | 2014-110658 A | 6/2014 |
| WO | WO-00/36298 A1 | 6/2000 |

* cited by examiner

CONFIGURATION DIAGRAM OF POWER GENERATION DEVICE

CHART OF AUTONOMOUS OPERATION RANGE

EXPLANATORY CHART OF STATES IN AUTONOMOUS OPERATION

OUTLINE DIAGRAM OF AUTONOMOUS OPERATION PROCEDURE

OUTLINE DIAGRAM OF AUTONOMOUS OPERATION PROCEDURE

CONFIGURATION DIAGRAM OF POWER GENERATION DEVICE

CHART OF OPERATION RANGE OF PERMANENT MAGNET
POWER GENERATOR IN CONTINUOUS OPERATION

METHOD FOR AUTONOMOUS OPERATION OF ELECTRICITY-GENERATING DEVICE

TECHNICAL FIELD

The present invention relates to a method for an autonomous operation of an electricity-generating device, and particularly relates to a method for an autonomous operation by an electricity-generating device using a permanent magnet power generator.

BACKGROUND ART

An electricity-generating device using a permanent magnet power generator as a small and medium-sized power generator and using a wind turbine or a water turbine as an energy source is attracting attention. FIG. 7 shows a single connection diagram of a water-turbine electricity-generating device using the permanent magnet power generator, and the water-turbine electricity-generating device is interconnected to an electric power system 6 through an interconnection transformer 5. In FIG. 7, Numeral 1 denotes a water turbine, numeral 2 denotes a flywheel and numeral 3 denotes a permanent magnet power generator, which are coupled through bearings 4.

Numeral 10 denotes a converter panel, and the converter panel is equipped with respective components including a first converter (inverter) 11, a second converter 12, a brake circuit for regenerative braking 13, a smoothing capacitor 14, a filter unit 15, electromagnetic switches 16, 17, and a breaker 18. Numeral 20 denotes a generator panel, which has a breaker 21 performing interconnection control with respect to the electric power system 6. Numeral 30 denotes a dummy resistor device, in which plural resistors 33 having different resistance values are connected through breakers 31 and electromagnetic switches 32 respectively.

Numeral 40 denotes an upper control unit, and the control unit 40 inputs rotation signals of the permanent magnet power generator 3 detected by an encoder through the converter panel 10. The control unit 40 also outputs control commands such as an output of a speed command to the converter panel 10, an output of a valve-position command to an inlet valve 1a of the water turbine and an output of an input command to the dummy resistor device 30. The electricity-generating device using the permanent magnet power generator shown in FIG. 1 is publicly known by, for example, Patent Publication 1 and so on.

When the electricity-generating device shown in FIG. 7 is interconnected to the electric power system 6, the breaker 21 is turned on by outputting an interconnection/operation command from the generator panel 20, then, the breaker 18 and the electromagnetic switch 17 are turned on in the converter panel 10, thereby converting alternate current from the electric power system 6 into direct current by the converter 12 to charge the smoothing capacitor 14. The input command is outputted to the electromagnetic switch 16 at a point when the initial charge of the smoothing capacitor 14 is performed and the preparation for operation is completed. The control unit 40 also outputs the speed command and a power factor command to the inverter 11 to operate the inverter 11, controlling the permanent magnet power generator 3 within an interconnection operation range to which dotted lines are given shown in FIG. 8.

In FIG. 8, the vertical axis indicates the shaft input of the permanent magnet power generator and the horizontal axis indicates the rotational speed. When a rated capacity is $f_0$, interconnection operation is performed while speeds $n_1$, $n_2$ around a rated speed $n_0$ form the operation range of the permanent magnet power generator.

When an abnormality occurs in the system interconnection during the interconnection operation, the operation of the converter 12 is stopped and a switching device 19 of the braking circuit 13 for regenerative control is turned on, thereby allowing electric current to flow in a regenerative resistor 19' and consuming the energy.

In the case where the small and medium-scaled electricity-generating device is operated by being interconnected to the electric power system, there may be a case where it is difficult to realize system interconnection when some kind of abnormality occurs in the electric power system as an interconnect destination. Even when a sufficient wind volume is secured in wind power generation and when a sufficient water volume is secured in water power generation, that is, even when energy for generating power is sufficient in both cases, the interconnecting electricity-generating device has to be stopped when the autonomous operation function is not provided. It is needless to say that the autonomous operation can be realized by specially adding the dummy resistor device or a high-speed guide vane control unit by an electric servo motor and so on to the electricity-generating device. However, it is necessary to add a peculiar operation function in that case, which is disadvantageous in aspects of an installation place and costs.

PRIOR ART PUBLICATIONS

Patent Publication

Patent Publication 1: Japanese Patent No. 4003414

SUMMARY OF THE INVENTION

It is an object of the present invention to provide a method for an autonomous operation of an electricity-generating device using wind power or water turbine efficiency-characteristics without adding a device for autonomous operation which has been hitherto necessary.

The present invention is directed to a method for an autonomous operation of an electricity-generating device including a permanent magnet power generator coupled to an energy source, first and second converters having forward/inverse conversion functions, a smoothing capacitor connecting to a DC linkage unit between the first and second converters and a control unit outputting control commands to the first and second converters, in which the electricity-generating device is operated along an efficiency-characteristics curve within a speed range from a rated speed to a maximum speed in the efficiency-characteristics curve of the energy source at the time of the autonomous operation of the electricity-generating device.

In an embodiment of the present invention, a load to the electricity-generating device is connected and disconnected.

In an embodiment of the present invention, the energy source is a water turbine, and during the autonomous operation, a valve-position command is outputted to an inlet valve of the water turbine and the first converter is operated in a converter mode when an operation preparation command is outputted by the control unit, the second converter is operated in an inverter mode when a voltage is established by the DC linkage unit, and the load is connected when the operation preparation is completed.

In an embodiment of the present invention, the efficiency-characteristics curve corresponding to the aperture of the inlet valve of the water turbine is used.

As described above, according to the present invention, even when parallel-off of the electricity-generating device from the electric power system is performed, the autonomous operation of the electricity-generating device is realized with the energy balance corresponding to the load within a speed range of the rated speed or more in the efficiency-characteristics curve. Accordingly, even when it is difficult for the electricity-generating device to perform system interconnection, the autonomous operation control can be performed without specially preparing a device for an isolated operation such as a dummy resistor device or a high-speed guide vane control unit by an electric servo motor.

MODE FOR IMPLEMENTING THE INVENTION

Figure 1:
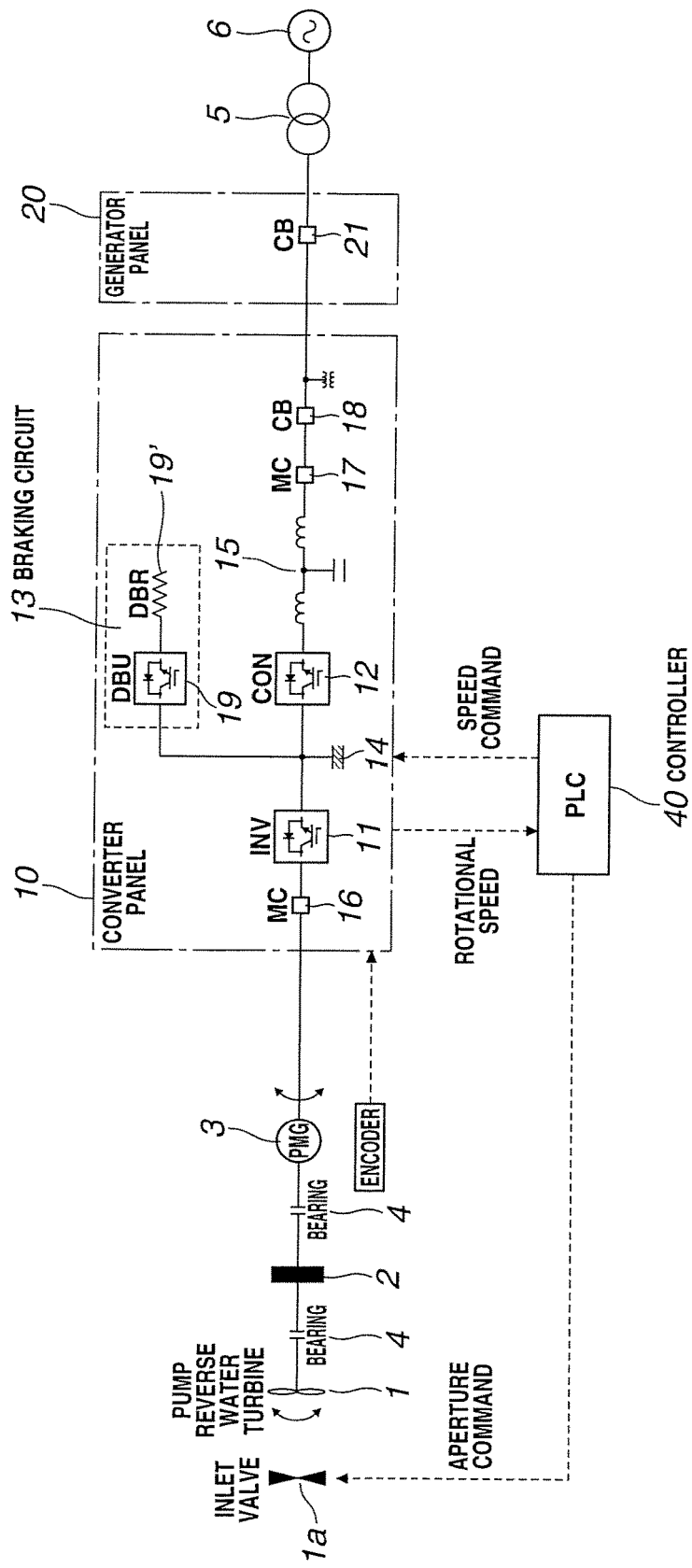
FIG. 1 is a view showing an interconnection state to an electric power system of an electricity-generating device according to an embodiment of the present invention.
Figure 7:
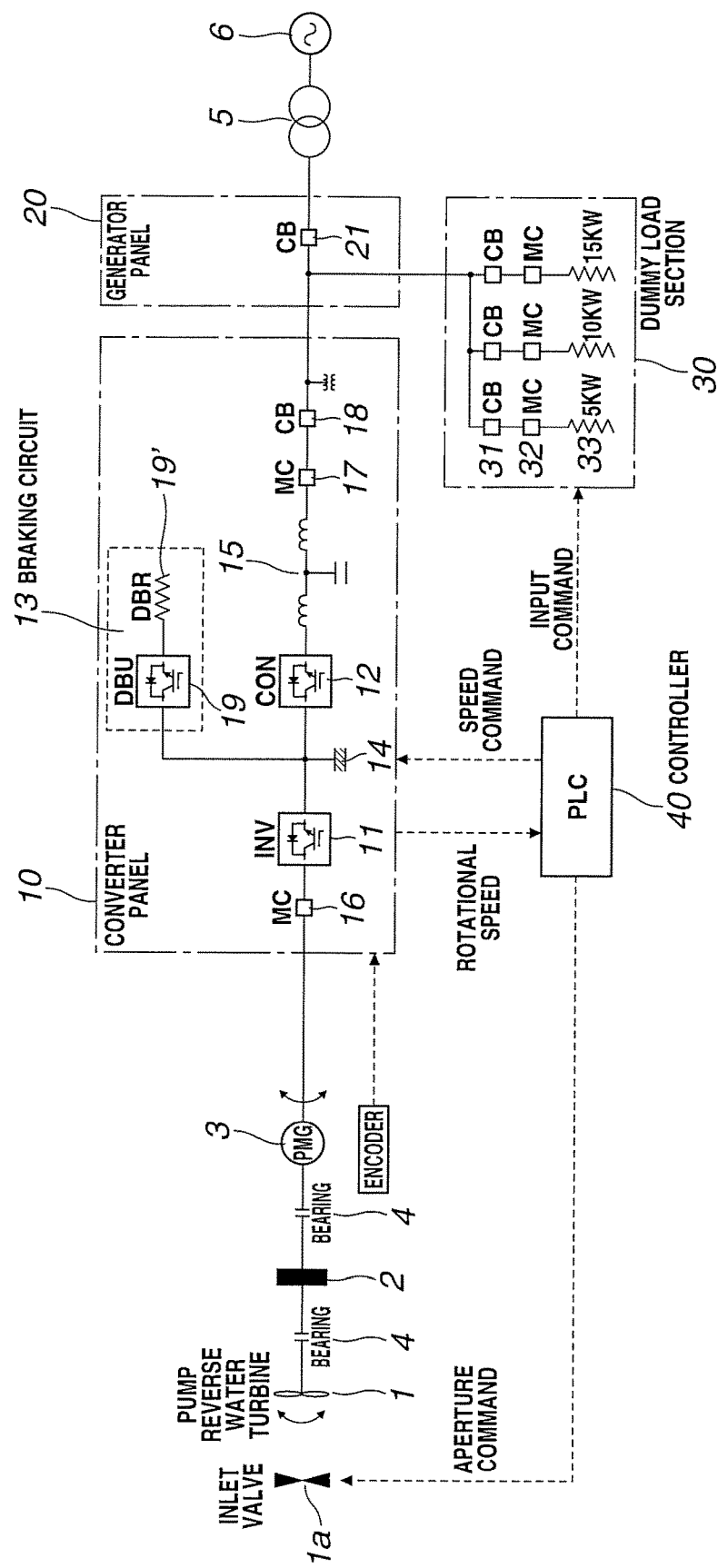
FIG. 7 is a view showing an interconnection state to an electric power system of a conventional electricity-generating device.
Figure 8:
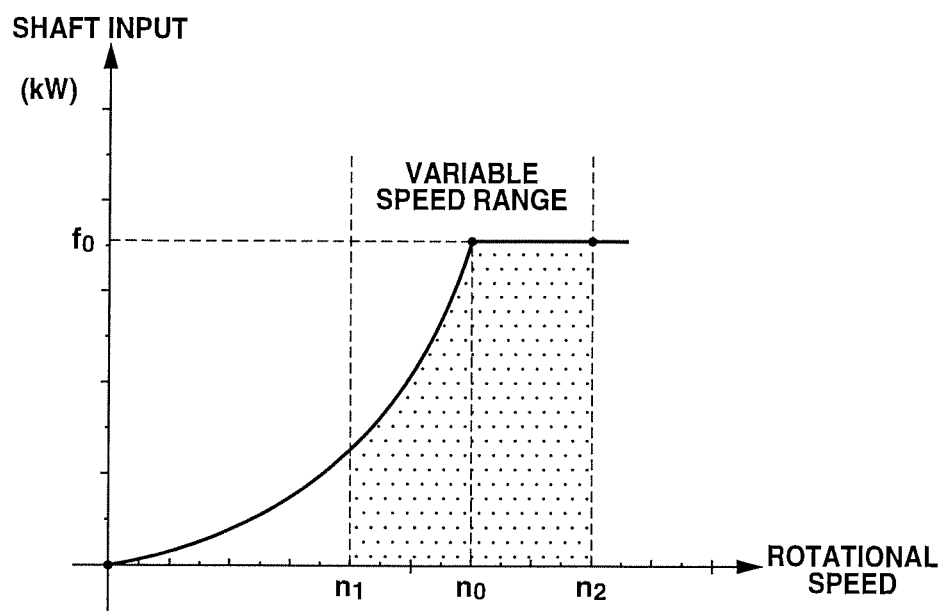
FIG. 8 is a view showing an operation range when a permanent magnet power generator is interconnected to the electric power system.

FIG. 1 is a schematic diagram showing an electricity-generating device according to the present Embodiment 1. FIG. 1 differs from FIG. 7 which shows a conventional electricity-generating device in a point that a dummy load device is omitted. Other points are the same as FIG. 7, therefore, explanation will be omitted.

Figure 2:
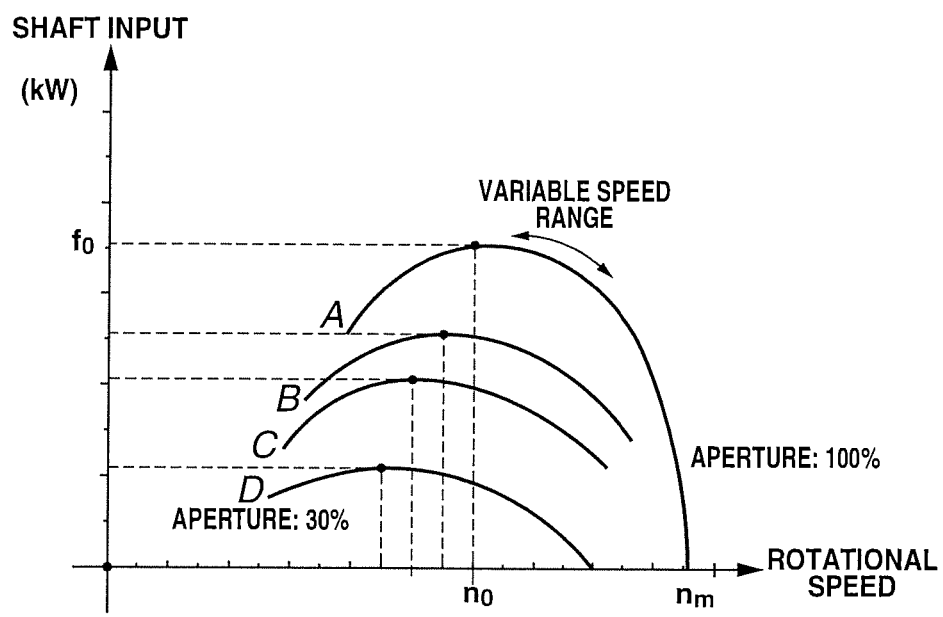
FIG. 2 is a chart showing an autonomous operation range of the electricity-generating device for explanation.

FIG. 2 shows efficiency-characteristics curves (hereinafter referred to as Cp characteristics curves) of a water turbine. When a rated capacity of a permanent magnet power generator is $f_0$ and a rated speed thereof is $n_0$, the shaft input is increased from a line D to a line A in accordance with an aperture of an inlet value $1a$ of a water turbine 1, and the generator is operated in the vicinity of the rated speed $n_0$ at the time of system interconnection.

Figure 3:
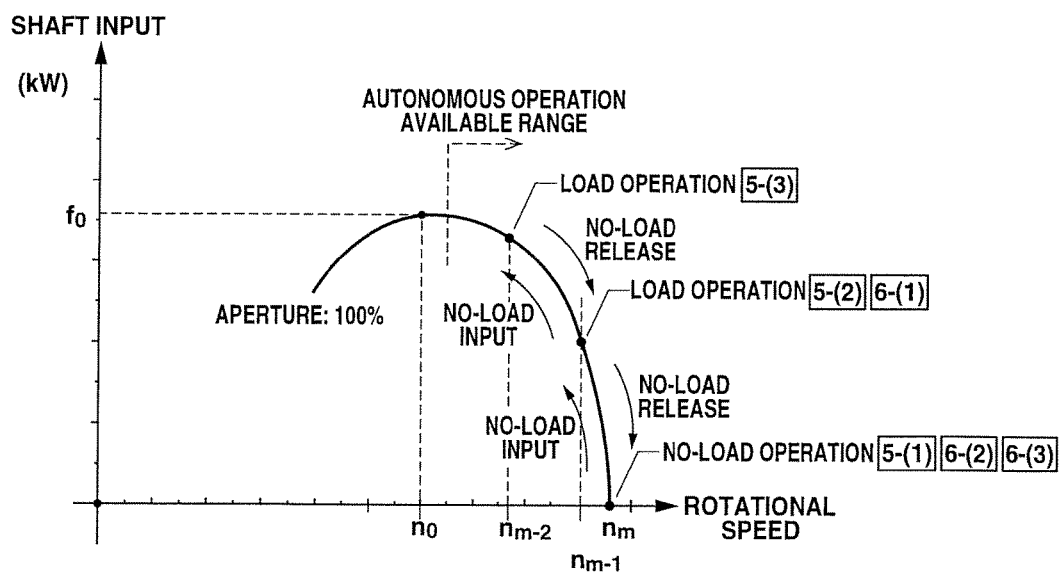
FIG. 3 is an explanatory chart of states at the time of autonomous operation.
Figure 4:
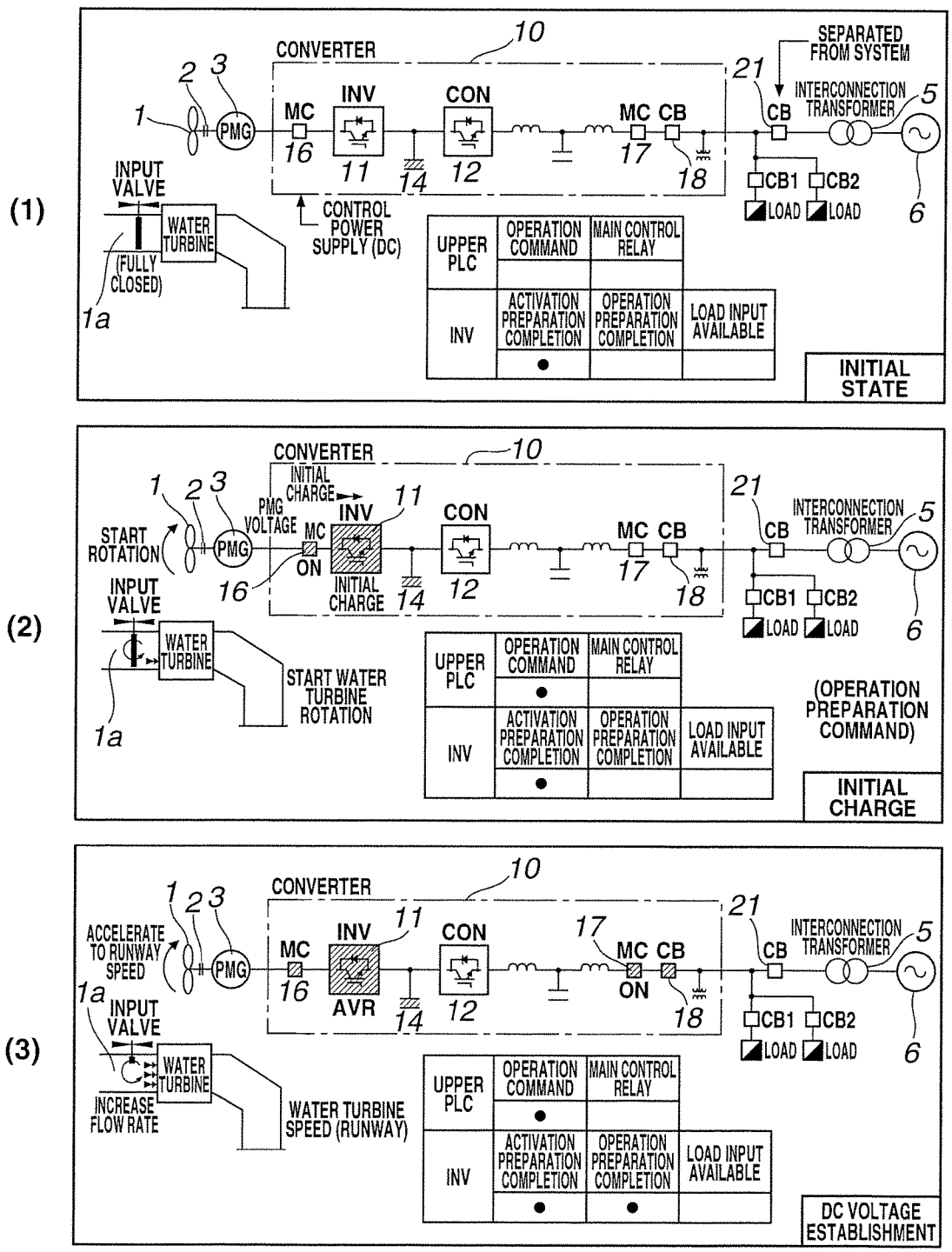
FIG. 4 is a view showing the outline of an operation procedure at the time of autonomous operation.
Figure 5:
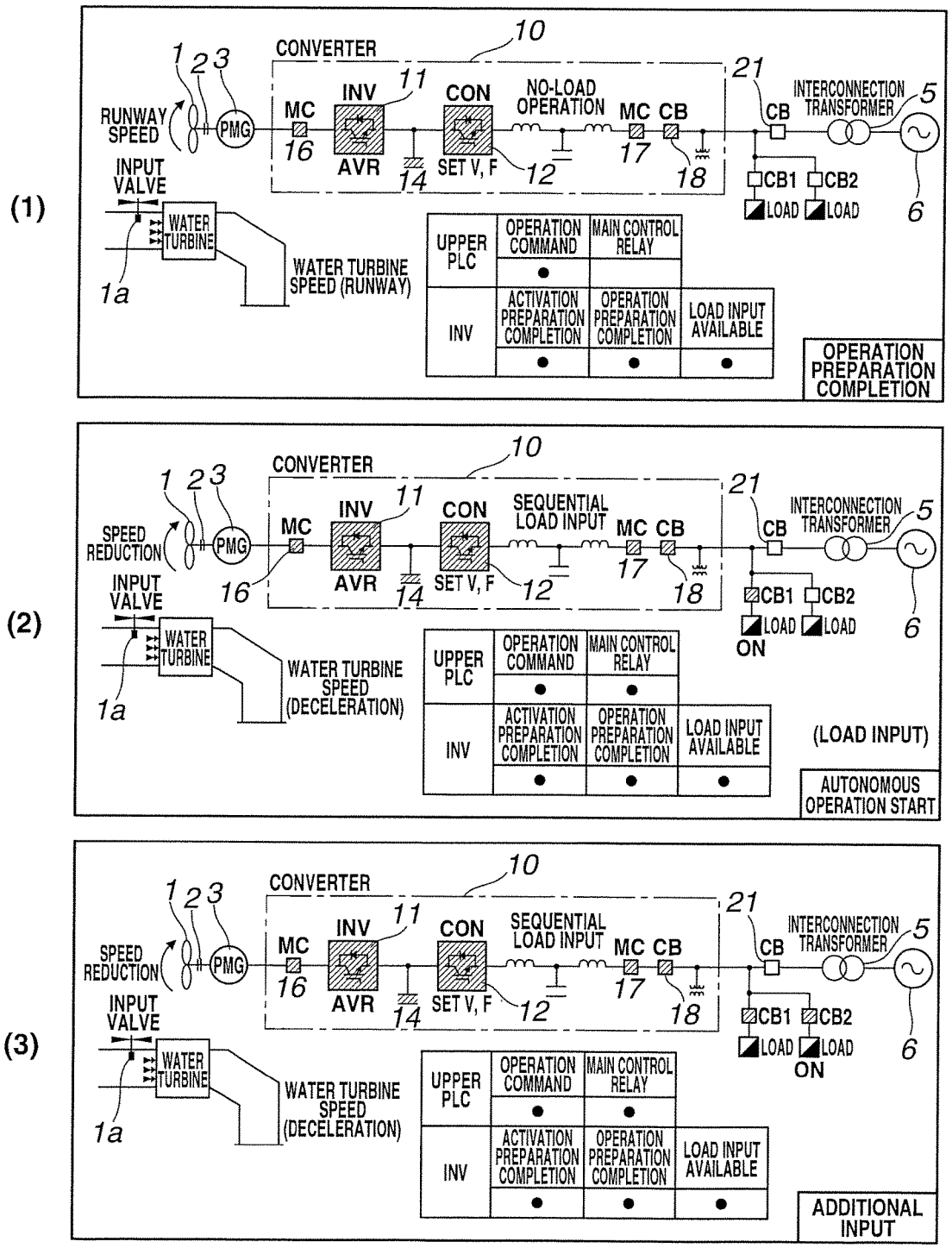
FIG. 5 is a view showing the outline of the operation procedure at the time of autonomous operation.
Figure 6:
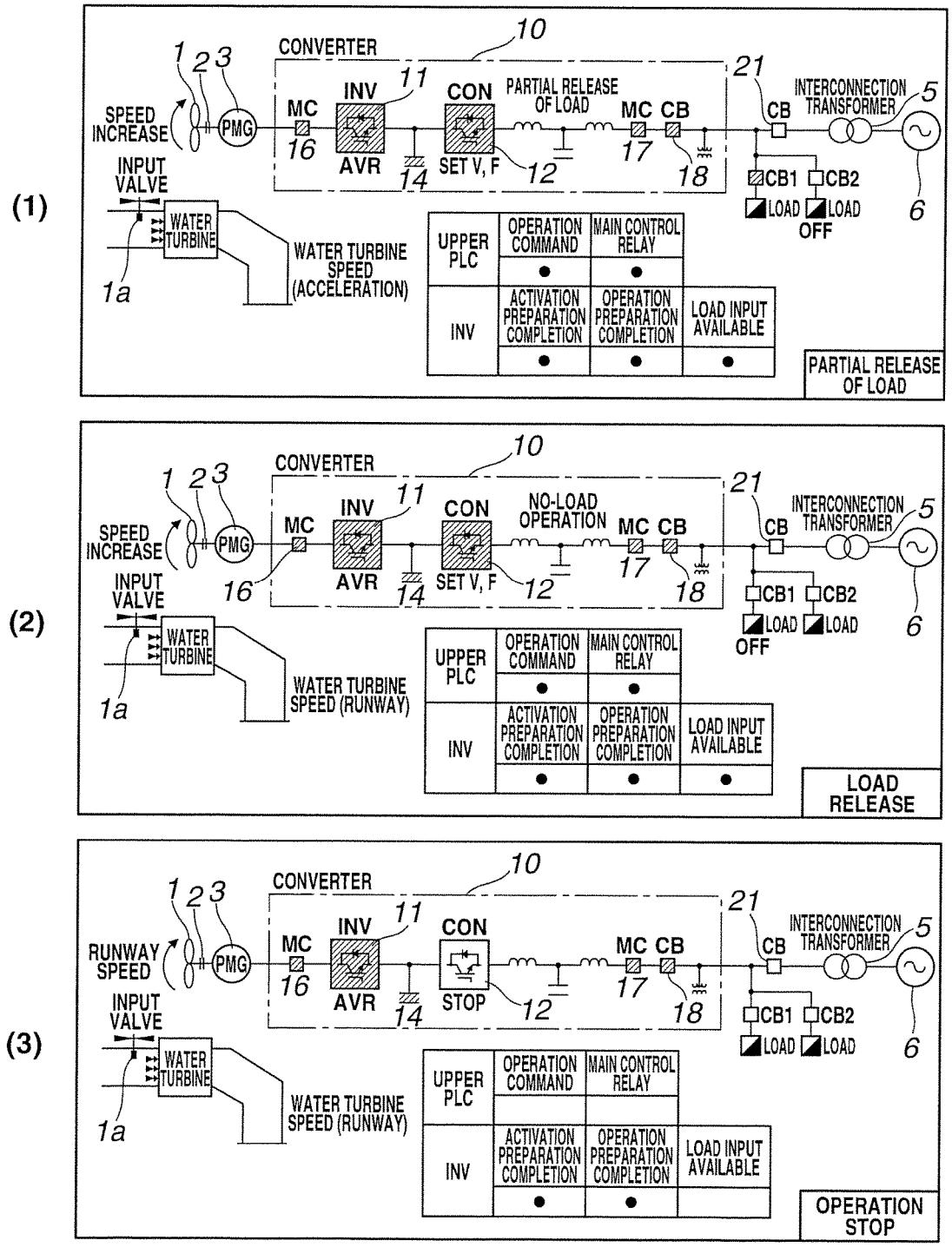
FIG. 6 is a view showing the outline of the operation procedure at the time of autonomous operation.

In the present invention, the autonomous operation is performed with respect to the load capacity which is lower than a rated capacity of the permanent magnet power generator in the case where the system interconnection is difficult to be performed. At the time of performing the autonomous operation, for example, a Cp characteristics curve at an aperture 100% of the line A is used as well as a range in which the speed is the rated speed no or higher is used as a variable speed range as shown in FIG. 3. Hereinafter, a method for the autonomous operation will be explained with reference to FIG. 4 to FIG. 6. In FIG. 4 to FIG. 6, components in an operation state are shown by being hatched.

FIG. 4 (1) to FIG. 6 (3) correspond to the outline showing an operation procedure in the autonomous operation by the electricity-generating device shown in FIG. 1. In FIG. 4 (1), a DC control power supply is connected to a converter panel 10 in the initial state of the electricity-generating device. The inlet value $1a$ of the water turbine 1 is in a closed state at this time. In FIG. 4 (2), a valve-position command to the inlet valve $1a$, input of an electromagnetic switch 16 and an operation preparation command for a first converter (inverter) 11 are outputted from an upper control unit 40. Accordingly, the water turbine 1 starts to rotate and a permanent magnet power generator 3 starts to generate power and generate a voltage. The initial charge to a smoothing capacitor 14 is started by the first converter (inverter) 11 being operated in a converter mode.

In FIG. 4 (3), the flow rate is increased as the aperture of the inlet valve $1a$ further progresses, and the water turbine 1 is accelerated into a runway speed (the rated speed no or higher). The charging to the smoothing capacitor 14 further progresses accordingly, and an electromagnetic switch 17 and a breaker 18 are inputted at the time when a voltage in a DC linkage unit is established.

In FIG. 5 (1), the water turbine is at the runway speed at the aperture 100% of the inlet valve $1a$, an output voltage is set and an output frequency is set with respect to a second converter 12, and the second converter 12 is allowed to have a function of automatically controlling voltage/frequency as an inverter operation to complete the operation preparation. As the device is in a no-load state when the operation preparation is completed, the water turbine rotates at a maximum rotational speed $n_m$ shown in FIG. 3. In FIG. 3, numerals inside square frames correspond to numerals in diagrams of FIG. 4 to FIG. 6.

In FIG. 5 (2), a load input command in a power plant is issued with respect to a breaker CB1 from the upper control unit 40, thereby starting the autonomous operation. When the load is inputted, a load current flows and the voltage in the DC linkage unit is reduced. However, the first converter (inverter) 11 controls the voltage in the DC linkage unit to be constant (AVR), thereby replenishing deficit of energy with rotation energy of the water turbine 1, a flywheel 2 and the permanent magnet power generator 3 as a rotating body and reducing the speed of the permanent magnet power generator 3 and the water turbine. As a result, the rotational speed is reduced along the Cp characteristics curve from the maximum rotational speed $n_m$, and the device is operated at a rotational speed of $n_{m-1}$ which corresponds to the load.

When an additional input command of the load is issued and a breaker CB2 is turned on in FIG. 5 (3), the rotational speed of the water turbine is further reduced in accordance with the inputted load amount, and the device is operated at a rotational speed of $n_{m-2}$. The range in which the load amount can be inputted is within a range of speed from the rated speed no to the maximum speed $n_m$.

The rotational speed of the water turbine 1 at the time of the autonomous operation has to be the rated speed no or more. The reason is that the rotational speed is reduced due to the overload and the rotation is finally stopped when operated at the rated speed no or less.

Next, a procedure of stopping the electricity-generating device will be explained with reference to FIG. 6. In the case where part of the load is released at the rotational speed $n_{m-2}$, the breaker CB2 is turned off as shown in FIG. 6 (1), then, the rotational speed is increased along the Cp characteristics curve. Then, the energy balance between the load and the power generation amount is achieved and the increase of rotational speed is stopped at the rotation of $n_{m-1}$, and the operation is continued at the rotational speed of $n_{m-1}$.

Furthermore, in a state where all load is released as shown in FIG. 6 (2), the no-load operation is performed at the rotational speed of $n_m$. In FIG. 6 (3), a stop command is outputted to the second converter 12 and the operation is stopped. After that, a stop command for the electricity-generating device is outputted and the first converter 11 is also stopped, then, a deceleration command is outputted to the inlet valve 1a of the water turbine and the inlet valve 1a is wholly closed to thereby stop the water turbine.

According to the present invention mentioned above, even when parallel-off of the electricity-generating device from the electric power system is performed, the autonomous operation of the electricity-generating device is realized by performing operation at a speed at which the energy balance corresponding to the load is achieved within a speed range of the rated speed or more in the Cp characteristics curve. Accordingly, when it is difficult for the electricity-generating device to perform system interconnection, the autonomous operation control can be performed only by allowing the electricity-generating device to have a software-based autonomous function by the device for interconnection operation without specially preparing devices for an isolated operation such as a dummy resistor device or a high-speed guide vane control unit by an electric servo motor.

The invention claimed is:

1. A method for an autonomous operation of an electricity-generating device interconnected to an electric power system, the electricity-generating device comprising:
  a permanent magnet power generator coupled to a water turbine;
  first and second converters having forward/inverse conversion functions;
  a smoothing capacitor connected to a DC linkage unit between the first and second converters; and
  a control unit outputting control commands to the first and second converters,
  wherein, when the autonomous operation of the electricity-generating device is conducted, the autonomous operation is an operation in which the electricity-generating device is separated from the electric power system, the method comprising:
  controlling, by the first converter, a voltage of the DC linkage unit to be constant,
  causing a load connected to the electricity-generating device to be connected or disconnected, and
  always operating the electricity-generating device along an efficiency-characteristics curve, when the autonomous operation of the electricity-generating device is conducted, that corresponds to an aperture of an inlet valve of the water turbine and is based on a shaft input and a rotational speed, only within a speed range from a rated speed, at which the shaft input of the efficiency-characteristics curve becomes maximum, to a maximum speed, at which the shaft input becomes minimum, in the efficiency-characteristics curve of the water turbine.

2. The method for the autonomous operation as claimed in claim 1, further comprising:
  outputting, during the autonomous operation, a valve-position command to the inlet valve of the water turbine and operating the first converter in a converter mode when an operation preparation command is outputted by the control unit, and
  operating the second converter in an inverter mode when a voltage is established by the DC linkage unit, and connecting the load when the operation preparation is completed.

* * * * *